US010509267B2

(12) United States Patent
Ma et al.

(10) Patent No.: US 10,509,267 B2
(45) Date of Patent: Dec. 17, 2019

(54) SUBSTRATE, DISPLAY PANEL AND MANUFACTURING METHODS THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Jun Ma, Beijing (CN); Bo Zhou, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 121 days.

(21) Appl. No.: 15/209,070

(22) Filed: Jul. 13, 2016

(65) Prior Publication Data
US 2017/0192268 A1    Jul. 6, 2017

(30) Foreign Application Priority Data

Jan. 4, 2016  (CN) .......................... 2016 1 0005555

(51) Int. Cl.
*G02F 1/1339* (2006.01)
*G02F 1/1333* (2006.01)

(52) U.S. Cl.
CPC ..................... *G02F 1/1339* (2013.01); *G02F 2001/133357* (2013.01)

(58) Field of Classification Search
CPC ..................................................... G02F 1/1339
See application file for complete search history.

(56) References Cited

U.S. PATENT DOCUMENTS

2004/0125315 A1    7/2004  Park et al.
2015/0301370 A1*  10/2015  Moriwaki ............ G02F 1/1339
                                                              349/42
2016/0056568 A1*   2/2016  Lo ...................... H01R 13/5202
                                                              439/587

FOREIGN PATENT DOCUMENTS

| CN | 103885249 A  | 6/2014  |
| CN | 203643711 U  | 6/2014  |
| CN | 103901671 A  | 7/2014  |
| CN | 105158989 A  | 12/2015 |

OTHER PUBLICATIONS

Second Office Action regarding Chinese Application No. 201610005555. 4, dated Dec. 15, 2016. Translation provided by Dragon Intellectual Property Law Firm.
First Office Action regarding Chinese application No. 201610005555. 4, dated Aug. 3, 2016. Translation provided by Dragon Intellectual Property Law Firm.

* cited by examiner

*Primary Examiner* — Edmond C Lau
(74) *Attorney, Agent, or Firm* — Harness, Dickey & Pierce, P.L.C.

(57) ABSTRACT

The present disclosure provides a substrate, a display panel and manufacturing methods thereof. The substrate includes a substrate body and a planarization layer arranged on the substrate body. The substrate is provided at a surface facing a liquid crystal layer with a groove or notch penetrating through the planarization layer, at least a portion of the groove or notch is located at a region where a sealant is applied, and a waterproof material is filled within the groove or notch.

15 Claims, 5 Drawing Sheets

SUBSTRATE, DISPLAY PANEL AND MANUFACTURING METHODS THEREOF

CROSS-REFERENCE TO RELATED APPLICATION

The present application claims a priority of the Chinese Patent Application No. 201610005555.4 filed on Jan. 4, 2016, which is incorporated herein by reference in its entirety.

TECHNICAL FIELD

The present disclosure relates to the field of display technology, in particular to a substrate, a display panel and their manufacturing methods.

BACKGROUND

For the manufacture of a conventional thin film transistor liquid crystal display (TFT LCD) device, as a passive light-emitting display device, usually a planarization layer made of a water-absorbing material is applied onto a color filter substrate and/or an array substrate before they are arranged opposite to each other to form a cell. In the case of a high-temperature and high-humidity pressure test (e.g., Pressure Cooker Test (PCT)) on the TFT LCD after the cell formation, water molecules may easily enter the cell through the planarization layer. As a result, the accuracy of the PCT, and thereby the reliability of the TFT LCD, will be adversely affected.

SUMMARY

An object of the present disclosure is to provide a substrate, a display panel and their manufacturing methods, so as to prevent moisture from entering a liquid crystal cell of the display panel through a planarization layer.

In one aspect, the present disclosure provides in some embodiments a substrate, including a substrate body and a planarization layer arranged on the substrate body. The substrate is provided at a surface facing a liquid crystal layer with a groove or notch penetrating through the planarization layer, at least a portion of the groove or notch is located at a region where a sealant is applied, and a waterproof material is filled within the groove or notch.

Optionally, the notch is an opening extending from an edge of the substrate toward the region where the sealant is applied.

Optionally, the waterproof material is a material also used for the sealant or is an organic waterproof material.

Optionally, the waterproof material is epoxy resin or a silane coupling agent.

Optionally, the groove or notch is of a depth in a direction facing the liquid crystal layer greater than or equal to a thickness of the planarization layer.

Optionally, the groove is of a width smaller than or equal to a width of the region where the sealant is applied.

Optionally, the groove is completely located at the region where the sealant is applied.

Optionally, the substrate is a color filter substrate or an array substrate.

In another aspect, the present disclosure provides in some embodiments a display panel including the above-mentioned substrates as a color filter substrate and an array substrate.

Optionally, the notch is an opening extending from an edge of the substrate toward the region where the sealant is applied.

Optionally, the waterproof material is a material also used for the sealant or is an organic waterproof material.

Optionally, the waterproof material is epoxy resin or a silane coupling agent.

Optionally, the groove or notch is of a depth in a direction facing the liquid crystal layer is greater than or equal to a thickness of the planarization layer.

Optionally, the groove is of a width smaller than or equal to a width of the region where the sealant is applied.

Optionally, the groove is completely located at the region where the sealant is applied.

In yet another aspect, the present disclosure provides in some embodiments a method for manufacturing a substrate, including steps of: providing a substrate body; forming a planarization layer on the substrate body; forming a groove or notch penetrating through the planarization layer, at least a portion of the groove or notch being located at a region where a sealant is applied; and filling a waterproof material into the groove or notch.

Optionally, the groove or notch is formed by etching the planarization layer.

Optionally, the groove is formed by etching the planarization layer at the region where the sealant is applied.

In still yet another aspect, the present disclosure provides in some embodiments a method for manufacturing a display panel, including steps of: forming grooves or notches in a color filter substrate and an array substrate at surfaces facing a liquid crystal layer, the grooves or notches penetrating through respective planarization layers of the color filter substrate and the array substrate, and at least a portion of each of the grooves or notches being located at a region where a sealant is applied; filling a waterproof material in the grooves or notches; and arranging the color filter substrate and the array substrate opposite to each other to form a cell.

Optionally, the step of arranging the color filter substrate and the array substrate opposite to each other to form a cell and the step of filling the waterproof material in the grooves or notches are performed simultaneously, and the waterproof material is a material also used for the sealant.

According to the substrate, the display panel and their manufacturing methods in the embodiments of the present disclosure, the planarization layer is arranged at the surface of the substrate facing the liquid crystal layer and provided with the groove or notch, at least a portion of the groove or notch is located at the region where the sealant is applied, and the waterproof material is filled into the groove or notch. During the cell formation, the waterproof material in the groove or notch is adhered to the sealant, so as to isolate the planarization layer at a display region of the substrate from the outside. As a result, during a PCT, it is able to prevent the moisture from entering the liquid crystal cell through the planarization layer, thereby to improve the PCT accuracy.

DETAILED DESCRIPTION OF THE EMBODIMENTS

Figure 1A:
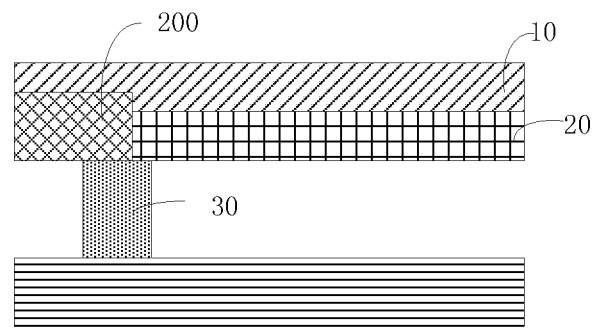
FIGS. 1A-1E are schematic views showing a substrate according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in some embodiments a substrate, which includes a substrate body and a planarization layer arranged on the substrate body. The substrate is provided at a surface facing a liquid crystal layer with a groove or notch penetrating through the planarization layer, at least a portion of the groove or notch is located at a region where a sealant is applied, and a waterproof material is filled within the groove or notch.

According to the substrate in the embodiments of the present disclosure, the planarization layer is arranged at the surface of the substrate facing the liquid crystal layer and provided with the groove or notch, at least a portion of the groove or notch is located at the region where the sealant is applied, and the waterproof material is filled into the groove or notch. During the cell formation, the waterproof material in the groove or notch is adhered to the sealant, so as to isolate the planarization layer at a display region of the substrate from the outside. As a result, during a PCT, it is able to prevent the moisture from entering the liquid crystal cell through the planarization layer, thereby to improve the PCT accuracy.

Further, the waterproof material may use a material also used for the sealant, so as to facilitate the adhesion of the waterproof material within the groove or notch to the sealant. In the embodiments of the present disclosure, the sealant may be any known sealant in the art, e.g., epoxy resin. The sealant has excellent water resistant property, so it may be used as the waterproof material filled within the groove or notch. Of course, the waterproof material is not limited to the sealant, and any other material capable of being adhered to the sealant may also be used. For example, an organic waterproof material such as a silane coupling agent may be filled within the groove or notch.

Further, the sealant may be directly filled in the groove or notch during the cell formation, so as to simplify the manufacture process, and prevent the moisture from entering the liquid crystal cell through the planarization layer.

The substrate may be a color filter substrate or an array substrate of a liquid crystal display (LCD) panel. The types of the substrate may depend on different structures of the substrate body and a manufacture process.

It should be appreciated that, the notch includes an opening extending from an edge of the substrate toward the region where the sealant is applied, and at least a portion of the notch is located at the region where the sealant is applied, as shown in FIGS. 1-6.

Referring to FIGS. 1A-1E, the substrate includes a substrate body 10 and a planarization layer 20 arranged on the substrate body 10. The substrate is provided at a surface facing a liquid crystal layer with a notch 200 penetrating through the planarization layer 20 and extending inward from an edge of the substrate, at least a portion of the notch 200 is located at a region where a sealant is applied, and a waterproof material is filled within the notch 200.

Figure 1B:
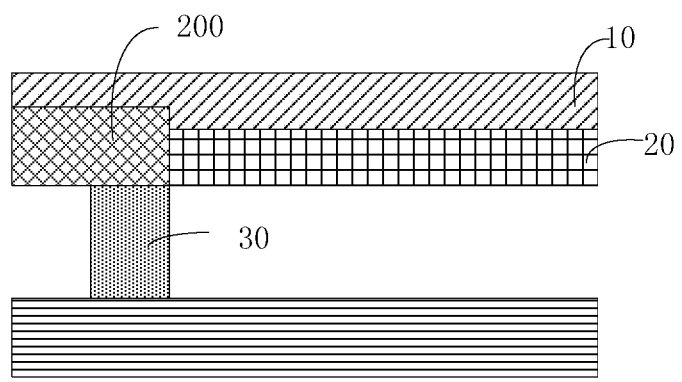
Figure 1C:
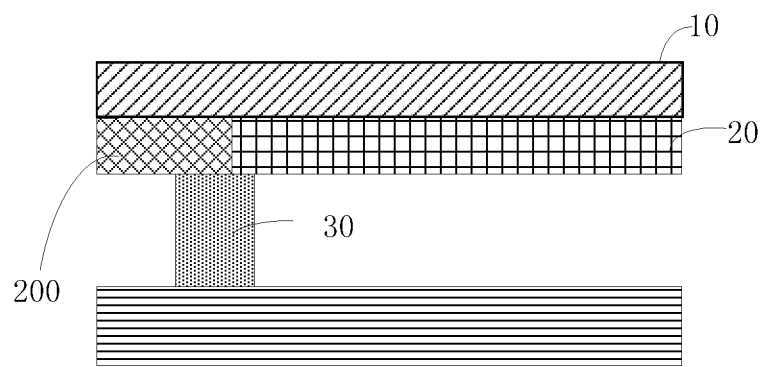
Figure 1D:
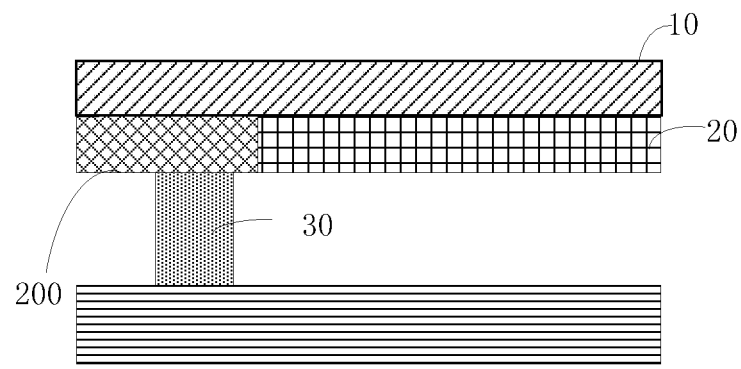

As shown in FIGS. 1A-1D, the notch may be provided in the substrate in various forms in accordance with the practical need. For example, the notch 200 may be arranged in an extension direction of the planarization layer 20, i.e., a horizontal direction as viewed in FIGS. 1A-1D. At this time, a region where the notch 200 is located may partially overlap the region where the sealant is applied (as shown in FIGS. 1A and 1C, the region where the notch 200 is located partially covers the region where the sealant is applied), or a side of the region where the notch 200 is located may be aligned to a boundary of the region where the sealant is applied (as shown in FIG. 1B, the region where the notch 200 is located completely covers the region where the sealant is applied), or the region where the notch 200 is located may extend beyond the region where the sealant is applied (as shown in FIG. 1D, the region where the notch 200 is located completely covers the region where the sealant is applied). In other words, no matter whether the region where the notch 200 is located completely covers the region where the sealant is applied, it is able for the waterproof material in the notch to prevent the moisture from entering the liquid crystal cell through the planarization layer, as long as the notch 200 penetrates through the planarization layer and at least a portion of the notch 200 is located at the region where the sealant is applied.

In addition, the notch 200 may be of a depth in a direction facing the liquid crystal layer greater than a thickness of the planarization layer as shown in FIGS. 1A and 1B, or equal to the thickness of the planarization layer as shown in FIGS. 1C and 1D. In other words, no matter whether the depth of the notch 200 in the direction facing the liquid crystal layer is greater than or equal to the thickness of the planarization layer, it is able for the waterproof material in the notch to prevent the moisture from entering the liquid crystal cell through the planarization layer, as long as the notch 200 penetrates through the planarization layer and at least a portion of the notch 200 is located at the region where the sealant is applied.

Figure 1E:
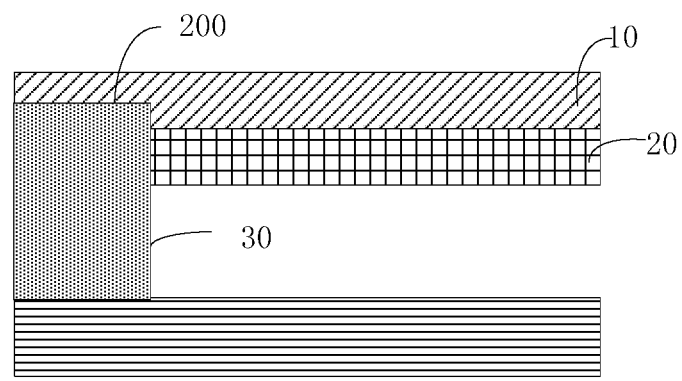

As shown in FIG. 1E, the waterproof material in the notch 200 may be a material also used for the sealant, and during the cell formation, the waterproof material may be filled in the notch while applying the sealant, so as to simplify the manufacture process. In addition, the sealant may be applied integrally with the waterproof material in the notch, so as to improve the adhesion.

In the embodiments of the present disclosure, the notch 200 is formed in the substrate, and the waterproof material is filled in the notch 200. At least a portion of the notch is located at the region where the sealant is applied, so the waterproof material in the notch may form an insulation layer together with the sealant. After the formation of the display panel, the planarization layer inside the liquid crystal cell may be insulated from the outside. Due to the water resistant property of the sealant itself, it is able to prevent the moisture from entering the liquid crystal cell through the planarization layer.

Figure 2:
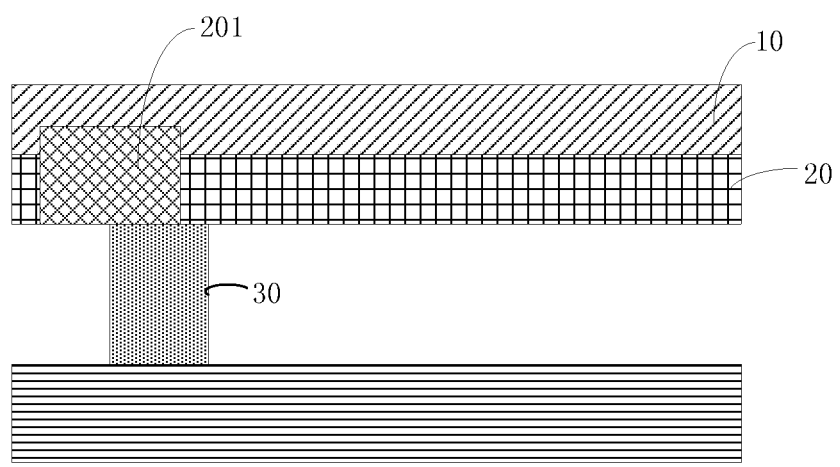
FIG. 2 is another schematic view showing the substrate according to one embodiment of the present disclosure.

As shown in FIG. 2, the substrate may include the substrate body 10 and the planarization layer 20 arranged on the substrate body 10. The substrate is provided at a surface facing a liquid crystal layer with a groove 201 penetrating through the planarization layer 20, at least a portion of the groove 201 is located at the region where the sealant is applied, and the waterproof material is filled within the groove.

In the embodiments of the present disclosure, a bottom of the groove 201 extends into the substrate body 10, so that the planarization layer 20 is divided into two portions by the waterproof material in the groove 201. In addition, a portion of the groove 201 is located at the region where the sealant is applied, so after the cell formation, it able for the sealant and the waterproof material in the groove 201 to isolate the planarization layer inside the cell from the outside, thereby to prevent the moisture from entering the cell through the planarization layer.

Figure 3:
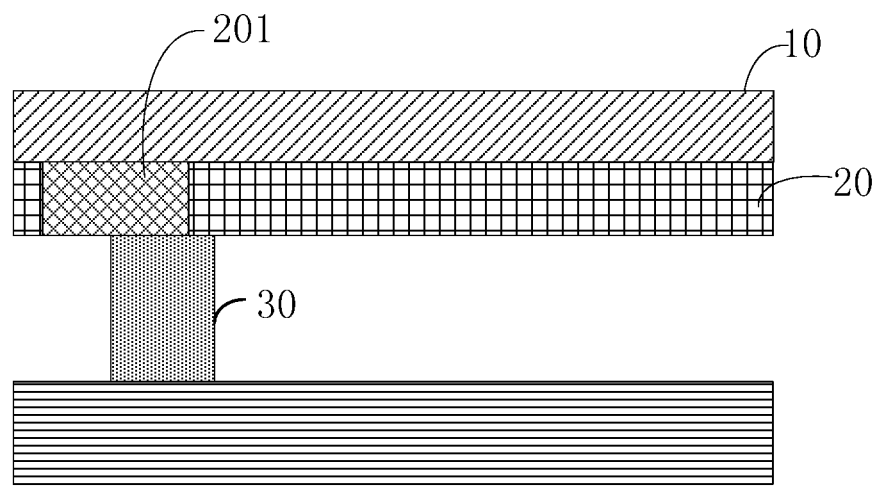
FIG. 3 is yet another schematic view showing the substrate according to one embodiment of the present disclosure.

As shown in FIG. 3, the substrate differs from that mentioned above merely in a position and a size of the groove. To be specific, the groove 201 is of a depth equal to the thickness of the planarization layer 20, i.e., during the manufacture, the groove is formed by partially etching the planarization layer 20 at the region where the sealant is applied. In this way, it is able to prevent the substrate body from being damaged.

Figure 4:
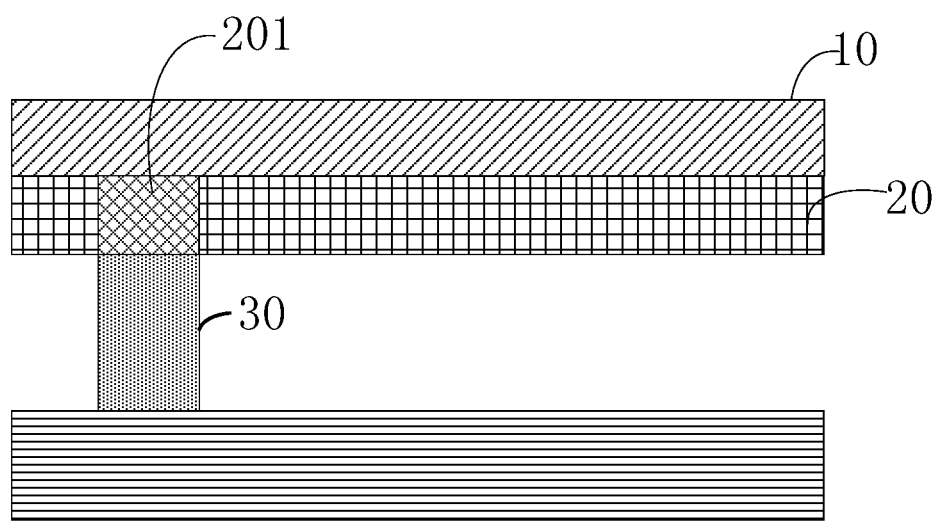
FIG. 4 is still yet another schematic view showing the substrate according to one embodiment of the present disclosure.

As shown in FIG. 4, in some embodiments of the present disclosure, the groove 201 is completely arranged in the substrate at the region where the sealant is applied. During the cell formation, the waterproof material in the groove is adhered to the sealant, so as to isolate portions of the planarization layer inside and outside the cell from each other, so as to prevent the moisture from entering the cell through the planarization layer.

Optionally, the depth of the groove 201 may also be greater than the thickness of the planarization layer.

Figure 5:
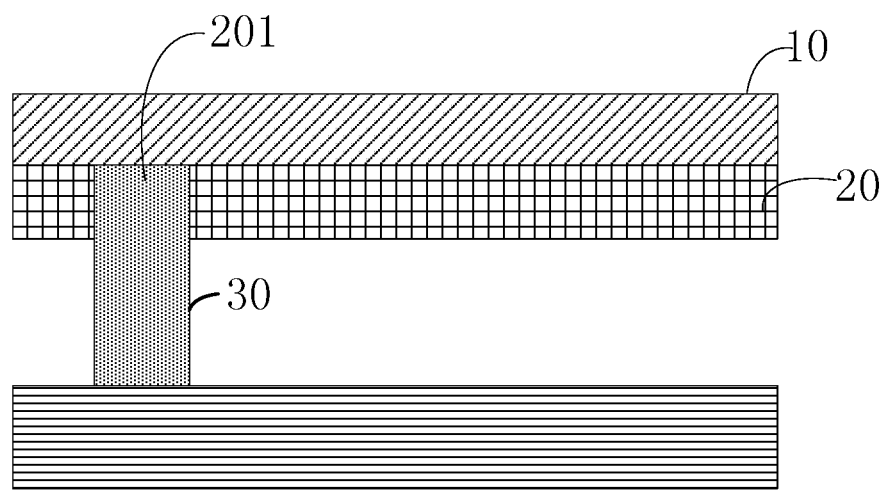
FIG. 5 is still yet another schematic view showing the substrate according to one embodiment of the present disclosure.

As shown in FIG. 5, in some embodiments of the present disclosure, the sealant is filled in the groove 201 as the waterproof material. In this way, during the cell formation, the waterproof material in the groove 201 may be formed integrally with the sealant, so as to prevent the moisture from entering the liquid crystal cell in a better manner.

Optionally, the waterproof material (the sealant) may not be filled in the groove 201 during the manufacture of the substrate, and instead, it may be filled in the groove 201 while applying the sealant in the case of cell formation, so as to simplify the manufacture process, and adhere the waterproof material in the groove 201 to the sealant in a better manner.

Figure 6:
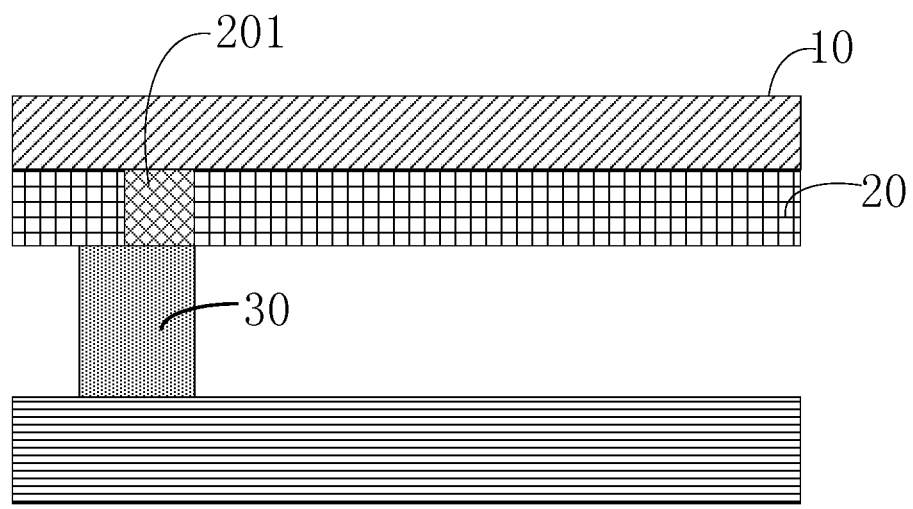
FIG. 6 is still yet another schematic view showing the substrate according to one embodiment of the present disclosure.

As shown in FIG. 6, in some embodiments of the present disclosure, the groove 201 in the substrate is of a width smaller than a width of the region where the sealant is applied, i.e., the groove 201 is formed by partially etching the substrate at the region where the sealant is applied. In this way, during the cell formation, it is able to isolate the portions of the planarization layer inside and outside the liquid crystal cell through the waterproof material in the groove 201 and the sealant, thereby to prevent the moisture from entering the liquid crystal cell.

In addition, in the embodiments of the present disclosure, the depth of the groove 201 may be greater than or equal to the thickness of the planarization layer.

The width of the groove 201 may be set in accordance with the manufacture process, and it is able for the waterproof material in the groove 201 to prevent the moisture from entering the liquid crystal cell, as long as a portion of the groove 201 is located at the region where the sealant is applied.

The present disclosure further provides in some embodiments a display device including the above-mentioned substrates as a color filter substrate and an array substrate.

According to the embodiments of the present disclosure, the above-mentioned substrates are used as the color filter substrate and the array substrate, and the planarization layer inside the liquid crystal cell is isolated from the outside through the waterproof material in the groove or notch as well as the sealant. As a result, during the PCT, it is able to prevent the moisture from entering the liquid crystal cell through the planarization layer, thereby to ensure the PCT accuracy.

Figure 7:
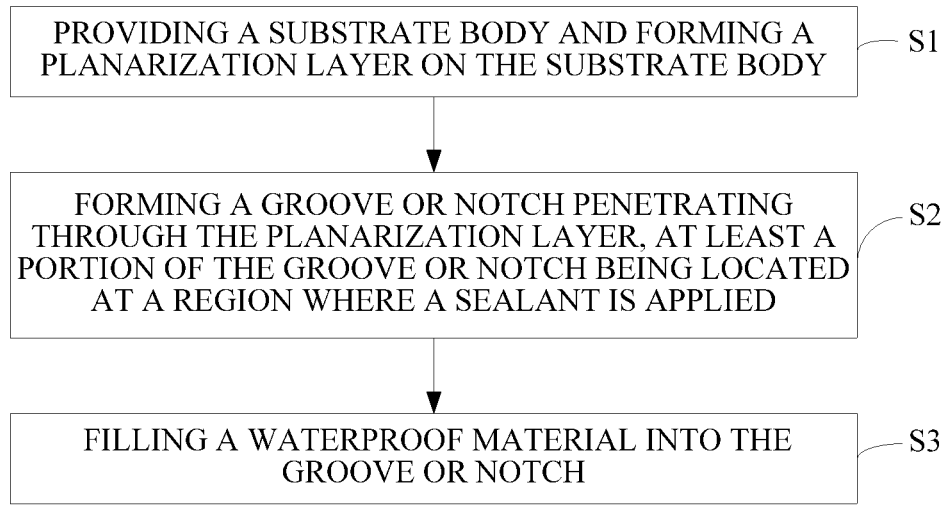
FIG. 7 is a flow chart of a method for manufacturing the substrate according to one embodiment of the present disclosure.

The present disclosure further provides in some embodiments a method for manufacturing the above-mentioned substrate which, as shown in FIG. 7, includes: Step S1 of providing the substrate body and forming the planarization layer on the substrate body; Step S2 of forming the groove or notch penetrating through the planarization layer, at least a portion of the groove or notch being located at the region where the sealant is applied; and Step S3 of filling the waterproof material into the groove or notch.

According to the method in the embodiments of the present disclosure, the groove or notch is arranged in the substrate, and the waterproof material is filled in the groove or notch. As a result, during the cell formation, it is able to isolate the planarization layer inside the liquid crystal cell from the outside through the waterproof material in the groove or notch as well as the sealant, thereby to prevent the moisture from entering the liquid crystal cell through the planarization layer.

In the embodiments of the present disclosure, the depth and width of the groove or notch may be set during the manufacture of the substrate. For example, the notch of a depth greater than or equal to the thickness of the planarization layer may be formed by etching at a surface of the substrate facing the liquid crystal layer, and then the waterproof material may be filled in the notch. Identically, the groove of a depth greater than the thickness of the planarization layer may be formed by etching at a surface of the substrate facing the liquid crystal layer, and then the waterproof material may be filled in the groove. During the manufacture of the substrate, in the case that the depth of the groove needs to be equal to the thickness of the planarization layer, it is merely required to etch the planarization layer to form the groove. In some other embodiments of the present disclosure, a position and a width of the groove may be set in such a manner as to isolate the planarization layer inside the liquid crystal cell from the outside.

Figure 8:
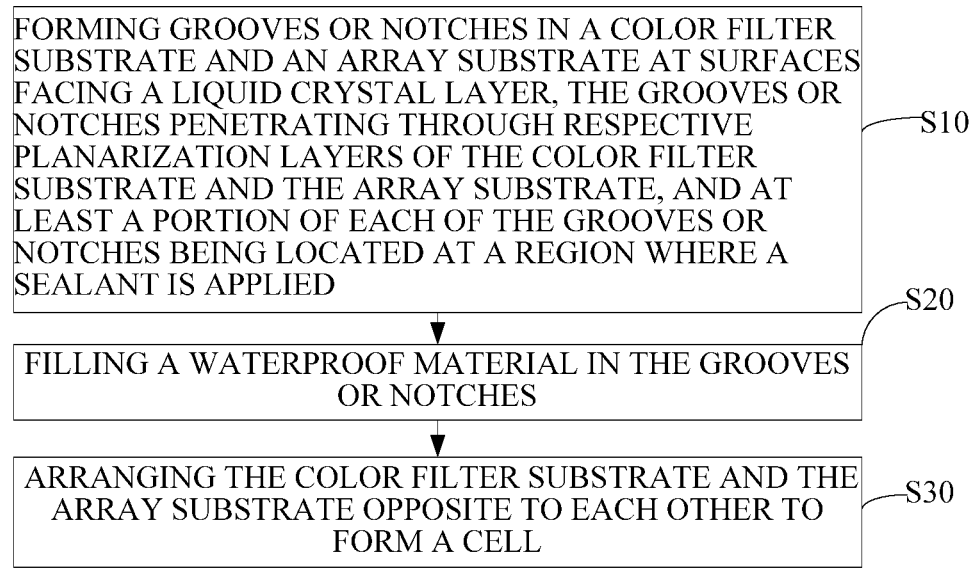
FIG. 8 is a flow chart of a method for manufacturing a display panel according to one embodiment of the present disclosure.

The present disclosure further provides in some embodiments a method for manufacturing a display panel which, as shown in FIG. 8, includes: Step S10 of forming the grooves or notches in the color filter substrate and the array substrate at surfaces facing a liquid crystal layer, the grooves or notches penetrating through respective planarization layers of the color filter substrate and the array substrate, and at least a portion of each of the grooves or notches being located at the region where the sealant is applied; Step S20 of filling a waterproof material in the grooves or notches; and Step S30 of arranging the color filter substrate and the array substrate opposite to each other to form a cell.

According to the method in the embodiments of the present disclosure, the groove or notch is formed by etching at the surface of each of the color filter substrate and the array substrate facing the liquid crystal layer, and the waterproof material is filled in the groove or notch. As a result, during the PCT on the display panel, it is able to prevent the moisture from entering the liquid crystal cell through the planarization layer.

In addition, in the embodiments of the present disclosure, Step S20 and Step S30 may be performed simultaneously, i.e., the sealant may be used as the waterproof material filled in the groove or notch. As a result, it is able to, before the cell formation, fill the sealant in the groove or notch while applying the sealant to the region where the sealant is to be applied, thereby to simplify the manufacture process and reduce the manufacture time.

In addition, it should be appreciated that, the waterproof material is not limited to the sealant, and any other waterproof material capable of being adhered to the sealant may also be used.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A substrate, comprising:
   a substrate body; and
   a planarization layer arranged on the substrate body,
   wherein a groove or notch penetrating through the planarization layer is provided at a surface of the substrate facing a liquid crystal layer, at least a portion of the groove or notch is located at a region where a sealant is applied, and a waterproof material is filled within the groove or notch,
   wherein in a direction perpendicular to a plane where an end surface of the substrate body is located, a width of the groove or notch is greater than a width of the region where the sealant is applied.

2. The substrate according to claim 1, wherein the notch is an opening extending from the end surface of the substrate body toward the region where the sealant is applied.

3. The substrate according to claim 1, wherein the waterproof material is a material also used for the sealant or is an organic waterproof material.

4. The substrate according to claim 3, wherein the waterproof material is epoxy resin or a silane coupling agent.

5. The substrate according to claim 1, wherein the substrate is a color filter substrate or an array substrate.

6. A display panel, comprising the substrate according to claim 1 as a color filter substrate and an array substrate.

7. The display panel according to claim 6, wherein the notch is an opening extending from an end surface of the substrate body toward the region where the sealant is applied.

8. The display panel according to claim 6, wherein the waterproof material is a material also used for the sealant or is an organic waterproof material.

9. The display panel according to claim 8, wherein the waterproof material is epoxy resin or a silane coupling agent.

10. A method for manufacturing a substrate, comprising steps of:
    providing a substrate body;
    forming a planarization layer on the substrate body;
    forming a groove or notch penetrating through the planarization layer, wherein the groove or notch is provided at a surface of the substrate facing a liquid crystal layer, and at least a portion of the groove or notch is located at a region where a sealant is applied; and
    filling a waterproof material into the groove or notch,
    wherein in a direction perpendicular to a plane where an end surface of the substrate body is located, a width of the groove or notch is greater than a width of the region where the sealant is applied.

11. The method according to claim 10, wherein the groove or notch is formed by etching the planarization layer.

12. A method for manufacturing a display panel, comprising steps of:
    forming grooves or notches in a color filter substrate and an array substrate at surfaces facing a liquid crystal layer, the grooves or notches penetrating through respective planarization layers of the color filter substrate and the array substrate, and at least a portion of each of the grooves or notches being located at a region where a sealant is applied;
    filling a waterproof material in the grooves or notches; and
    arranging the color filter substrate and the array substrate opposite to each other to form a cell,
    wherein in a direction perpendicular to a plane where an end surface of the planarization layer is located, a width of each of the grooves or notches is greater than a width of the region where the sealant is applied.

13. The method according to claim 12, wherein the step of arranging the color filter substrate and the array substrate opposite to each other to form a cell and the step of filling the waterproof material in the grooves or notches are performed simultaneously, and the waterproof material is a material also used for the sealant.

14. The substrate according to claim 1, wherein in a direction perpendicular to a plane where the substrate body is located, the groove or notch has a depth greater than or equal to a thickness of the planarization layer.

15. The display panel according to claim 6, wherein in a direction perpendicular to a plane where the substrate body is located, the groove or notch has a depth greater than or equal to a thickness of the planarization layer.

* * * * *